United States Patent [19]
Sheridan et al.

[11] Patent Number: 5,800,905
[45] Date of Patent: Sep. 1, 1998

[54] PAD INCLUDING HEAT SINK AND THERMAL INSULATION AREA

[75] Inventors: William M. Sheridan, St. Louis; Raymond E. Ragland, Union, both of Mo.

[73] Assignee: ATD Corporation, St. Louis, Mo.

[21] Appl. No.: 530,094

[22] Filed: Sep. 19, 1995

Related U.S. Application Data

[63] Continuation of Ser. No. 181,861, Jan. 11, 1994, which is a continuation of Ser. No. 542,131, Jun. 22, 1990, abandoned, which is a continuation-in-part of Ser. No. 468,425, Jan. 22, 1990, Pat. No. 5,011,743.

[51] Int. Cl.$^6$ .............. B32B 3/02; B32B 15/04; B22D 3/00; B22F 5/00
[52] U.S. Cl. .......... 428/157; 156/219; 156/222; 156/251; 428/133; 428/134; 428/164; 428/166; 428/172; 428/457; 428/544; 428/571; 428/594; 428/600; 428/603; 428/606; 428/607; 428/615
[58] Field of Search ................... 428/593, 594, 428/603, 604, 600, 601, 583, 582, 577, 133, 138, 164, 166, 172, 157, 457, 544, 571, 606, 607, 615; 52/792, 796, 797, 798, 809; 296/39.3; 138/DIG. 10; 156/219, 222, 251

[56] References Cited

U.S. PATENT DOCUMENTS

| | | |
|---|---|---|
| 273,688 | 3/1883 | Kelly . |
| 642,685 | 2/1900 | Farley . |
| 649,800 | 5/1900 | Bollard . |

(List continued on next page.)

FOREIGN PATENT DOCUMENTS

| | | |
|---|---|---|
| A-67862787 | 7/1988 | Australia . |
| 668860 | 8/1963 | Canada . |

(List continued on next page.)

OTHER PUBLICATIONS

Turner, William C. and Malloy, John F., "Thermal Insulation Handbook," (1981) (Excerpts).

"Standard Recommended Practice for Prefabricated Reflective Insulation Systems for Equipment and Pipe Operating at Temperatures Above Ambient Air", ASTM C 667–80, pp. 265–268.

"Standard Practice for Evacuated Reflective Insulation in Cryogenic Service", ASTM C 740–82, pp. 367–375 (1987).

American Heritage Dictionary, Second College Edition, p. 601.

(List continued on next page.)

Primary Examiner—Morton Foelak
Attorney, Agent, or Firm—Burns, Doane, Swecker & Mathis

[57] ABSTRACT

A pad including thermal insulation and heat sink areas. The pad includes a plurality of layers of metal foil forming a stack with the layers arranged one above the other, the stack including at least one heat sink area and at least one insulating area adjacent to the heat sink area, the layers providing better heat conduction in the vertical direction at the heat sink area than at the insulating area. At least one of the layers includes a plurality of embossments therein separating the one layer from an adjacent one of the layers in the insulating area. The pad can include a single insulating area surrounded by a heat sink area and a black coating can be provided on selected portions of the layers to improve heat radiating characteristics of the pad. For instance, the heat sink area can be coated with the black coating to radiate heat away from the pad at a desired location. The pad is particularly useful in shielding a heat sensitive component on one side of the pad from a heat source on the other side of the pad. The pad can be covered with a prescored and/or embossed metal sheet coated on one or both sides with adhesive. The sheet can also be used by itself for fixturing. The sheet can be secured to an object by heating to cause the adhesive to adhere to the object. The prescoring can be perforations in the sheet and the embossments can be in a diamond shaped cross-hatching configuration.

75 Claims, 4 Drawing Sheets

U.S. PATENT DOCUMENTS

| | | | |
|---|---|---|---|
| 1,093,648 | 4/1914 | Potter . | |
| 1,324,297 | 12/1919 | Braddick . | |
| 1,361,364 | 12/1920 | Burlingham . | |
| 1,374,905 | 4/1921 | Casey et al. . | |
| 1,505,703 | 8/1924 | Darley . | |
| 1,569,734 | 1/1926 | Fassett . | |
| 1,749,433 | 3/1930 | Kussa et al. . | |
| 1,766,471 | 6/1930 | Van Dusen | 428/140 |
| 1,801,666 | 4/1931 | Geer | 428/285 |
| 1,815,570 | 7/1931 | Jones | 165/159 |
| 1,890,418 | 12/1932 | Schmidt | 424/76 |
| 1,890,625 | 12/1932 | Shaw . | |
| 1,910,703 | 5/1933 | Grand | 52/261 |
| 1,934,174 | 11/1933 | Dyckerhoff | 428/188 |
| 1,966,133 | 7/1934 | Pieper | 257/245 |
| 1,974,665 | 9/1934 | Schnetzer et al. | 428/595 |
| 1,987,798 | 1/1935 | Ruppricht | 428/183 |
| 2,010,180 | 8/1935 | DeFerranti | 126/211 |
| 2,110,660 | 3/1938 | Doczekal | 392/436 |
| 2,151,535 | 3/1939 | Scurlock . | |
| 2,170,937 | 8/1939 | Bruning | 220/89.2 |
| 2,180,373 | 11/1939 | Sibley et al. | 52/407.1 |
| 2,212,481 | 8/1940 | Sendzimir | 228/118 |
| 2,226,589 | 12/1940 | Smyers | 428/248 |
| 2,274,765 | 3/1942 | Zalkind | 428/133 |
| 2,312,301 | 3/1943 | Turner | 428/457 X |
| 2,312,987 | 3/1943 | Grassick | 52/792 |
| 2,441,476 | 5/1948 | Ewald | 428/594 X |
| 2,445,801 | 7/1948 | Partiot | 428/594 X |
| 2,481,046 | 9/1949 | Scurlock | 428/594 X |
| 2,512,875 | 6/1950 | Reynolds | 392/435 |
| 2,543,101 | 2/1951 | Francis, Jr. | 428/239 |
| 2,576,073 | 11/1951 | Kropa et al. | 156/77 |
| 2,576,698 | 11/1951 | Russum . | |
| 2,591,578 | 4/1952 | McNealy et al. . | |
| 2,638,643 | 5/1953 | Olson | 428/577 |
| 2,644,736 | 7/1953 | Atchison | 312/237 |
| 2,668,692 | 2/1954 | Hammell | 165/156 |
| 2,720,948 | 10/1955 | Pajak | 139/34 |
| 2,771,754 | 11/1956 | Winkler . | |
| 2,772,382 | 11/1956 | Escoffery | 317/234 |
| 2,783,358 | 2/1957 | Wolf | 219/529 |
| 2,926,761 | 3/1960 | Herbert, Jr. | 428/593 |
| 2,962,811 | 12/1960 | Herbert, Jr. | 228/181 |
| 2,963,128 | 12/1960 | Rapp | 428/594 |
| 2,967,225 | 1/1961 | Carrier, Jr. et al. | 392/352 |
| 3,029,910 | 4/1962 | Kirk et al. | 428/593 |
| 3,152,033 | 10/1964 | Black et al. | 428/138 |
| 3,167,159 | 1/1965 | Bovenkerk | 189/34 |
| 3,175,958 | 3/1965 | Bourgade | 376/287 |
| 3,190,412 | 6/1965 | Rutter et al. | 428/593 |
| 3,196,763 | 7/1965 | Rushton . | |
| 3,212,864 | 10/1965 | Rhudy . | |
| 3,244,224 | 4/1966 | Hnilicka, Jr. | 165/32 |
| 3,348,991 | 10/1967 | Abell et al. | 156/300 |
| 3,354,021 | 11/1967 | Royet | 428/133 |
| 3,365,092 | 1/1968 | Blessing . | |
| 3,378,613 | 4/1968 | Hampshire | 264/45.3 |
| 3,385,749 | 5/1968 | Hampshire | 428/113 |
| 3,387,333 | 6/1968 | Irvine et al. | 425/404 |
| 3,486,961 | 12/1969 | Adams | 156/281 |
| 3,497,383 | 2/1970 | Olyphant, Jr. et al. | 117/212 |
| 3,576,964 | 5/1971 | Williams . | |
| 3,594,250 | 7/1971 | Mueller-Tamm et al. | 156/194 |
| 3,619,340 | 11/1971 | Jones | 161/127 |
| 3,629,549 | 12/1971 | Svendsen | 219/216 |
| 3,640,556 | 2/1972 | Bennett . | |
| 3,676,288 | 7/1972 | Hoyle | 428/283 |
| 3,684,610 | 8/1972 | Frielingsdorf et al. | 156/244.19 |
| 3,698,145 | 10/1972 | Newman et al. | 52/144 |
| 3,725,169 | 4/1973 | Allen et al. | 156/184 |
| 3,757,856 | 9/1973 | Kun | 165/166 |
| 3,800,018 | 3/1974 | Charpentier | 264/53 |
| 3,904,379 | 9/1975 | Oser et al. . | |
| 3,916,141 | 10/1975 | Czohara . | |
| 3,934,066 | 1/1976 | Murch | 428/248 |
| 3,934,748 | 1/1976 | Racz . | |
| 3,940,811 | 3/1976 | Tomikawa et al. | 5/361 |
| 3,958,714 | 5/1976 | Barriere et al. | 220/442 |
| 3,971,867 | 7/1976 | Randall . | |
| 3,981,689 | 9/1976 | Trelease | 29/183 |
| 3,992,835 | 11/1976 | Saveker . | |
| 3,993,828 | 11/1976 | McCorsley, III | 428/236 |
| 4,013,815 | 3/1977 | Dorfman | 428/285 |
| 4,025,996 | 5/1977 | Saveker | 428/594 |
| 4,037,751 | 7/1977 | Miller et al. | 220/426 |
| 4,038,447 | 7/1977 | Brock | 428/72 |
| 4,089,163 | 5/1978 | Yamazaki et al. | 60/282 |
| 4,162,877 | 7/1979 | Nyberg | 425/84 |
| 4,168,610 | 9/1979 | Engquist | 60/322 |
| 4,195,477 | 4/1980 | Yamazaki et al. | 60/282 |
| 4,211,590 | 7/1980 | Steward et al. | 156/79 |
| 4,221,094 | 9/1980 | Murdock . | |
| 4,234,040 | 11/1980 | Argyle et al. | 165/164 |
| 4,238,179 | 12/1980 | Llabres et al. | 425/394 |
| 4,255,817 | 3/1981 | Heim | 2/2 |
| 4,257,791 | 3/1981 | Wald | 55/382 |
| 4,258,521 | 3/1981 | Fricker et al. | 52/406 |
| 4,287,248 | 9/1981 | Gessner et al. | 428/137 |
| 4,296,162 | 10/1981 | Jean | 428/213 |
| 4,298,061 | 11/1981 | Hoeffken | 165/170 |
| 4,298,207 | 11/1981 | Hopper et al. | 277/230 |
| 4,312,909 | 1/1982 | Shaw | 428/215 |
| 4,318,965 | 3/1982 | Blair | 428/593 |
| 4,323,620 | 4/1982 | Iwabuchi et al. | 428/457 X |
| 4,343,866 | 8/1982 | Oser et al. | 428/593 |
| 4,344,591 | 8/1982 | Jackson | 244/158 A |
| 4,346,140 | 8/1982 | Carlson et al. | 428/252 |
| 4,348,442 | 9/1982 | Figge | 428/72 |
| 4,350,727 | 9/1982 | Wald et al. | 428/102 |
| 4,352,393 | 10/1982 | Vidal-Meza | 165/166 |
| 4,365,665 | 12/1982 | Nakamura | 165/80.3 |
| 4,375,493 | 3/1983 | George et al. | 428/246 |
| 4,386,128 | 5/1983 | Yoshikawa | 428/152 |
| 4,395,453 | 7/1983 | Lines, Jr. et al. | 428/216 |
| 4,395,455 | 7/1983 | Frankosky | 428/299 |
| 4,401,706 | 8/1983 | Sovilla | 428/158 |
| 4,401,707 | 8/1983 | Bailey et al. | 428/166 |
| 4,425,497 | 1/1984 | Leary et al. | 219/544 |
| 4,428,999 | 1/1984 | George et al. | 428/246 |
| 4,430,286 | 2/1984 | Franz | 264/258 |
| 4,430,553 | 2/1984 | Antimovski | 219/258 |
| 4,433,542 | 2/1984 | Shimura . | |
| 4,434,643 | 3/1984 | Almqvist et al. | 72/379.6 |
| 4,443,517 | 4/1984 | Shah | 428/281 |
| 4,446,191 | 5/1984 | Miyadera et al. | 427/193 |
| 4,454,189 | 6/1984 | Fukata | 428/224 |
| 4,456,208 | 6/1984 | MacConochie et al. | 244/158 |
| 4,463,465 | 8/1984 | Parker et al. | 5/459 |
| 4,485,138 | 11/1984 | Yamamoto et al. | 428/131 |
| 4,489,852 | 12/1984 | Logan et al. . | |
| 4,499,134 | 2/1985 | Whitely et al. | 428/102 |
| 4,500,589 | 2/1985 | Schijve et al. | 428/213 |
| 4,500,593 | 2/1985 | Weber | 428/257 |
| 4,504,991 | 3/1985 | Klancnik | 5/459 |
| 4,517,249 | 5/1985 | Panush | 428/463 |
| 4,522,876 | 6/1985 | Hiers | 428/285 |
| 4,533,583 | 8/1985 | May . | |
| 4,535,017 | 8/1985 | Kuckein et al. | 428/77 |
| 4,539,252 | 9/1985 | Franz | 428/218 |
| 4,555,543 | 11/1985 | Effenberger et al. | 524/520 |
| 4,557,969 | 12/1985 | Berbner et al. | 428/283 |

| Patent No. | Date | Inventor | Class |
|---|---|---|---|
| 4,559,862 | 12/1985 | Case et al. | 87/1 |
| 4,569,870 | 2/1986 | Shinmi | 428/57 |
| 4,579,756 | 4/1986 | Edgel . | |
| 4,595,120 | 6/1986 | Logan et al. . | |
| 4,597,818 | 7/1986 | Aoyama et al. | 156/308.2 |
| 4,600,053 | 7/1986 | Patel et al. | 165/170 |
| 4,601,943 | 7/1986 | Haushofer et al. | 428/246 |
| 4,603,460 | 8/1986 | Yano et al. | 24/890.039 |
| 4,609,067 | 9/1986 | Gonwa | 181/211 |
| 4,609,433 | 9/1986 | Crutchfield et al. | 162/145 |
| 4,612,239 | 9/1986 | Dimanshteyn | 428/246 |
| 4,631,221 | 12/1986 | Disselbeck et al. | 428/166 |
| 4,656,814 | 4/1987 | Lockington | 53/450 |
| 4,671,979 | 6/1987 | Adiletta | 428/74 |
| 4,678,115 | 7/1987 | Weisert | 228/183 |
| 4,678,702 | 7/1987 | Lancaster et al. | 428/252 |
| 4,680,228 | 7/1987 | Sharma | 428/378 |
| 4,687,697 | 8/1987 | Cambo et al. | 428/201 |
| 4,688,631 | 8/1987 | Peze et al. | 165/166 |
| 4,695,509 | 9/1987 | Cordova et al. | 428/267 |
| 4,698,258 | 10/1987 | Harkins, Jr. | 428/285 |
| 4,703,159 | 10/1987 | Blair | 219/78.12 |
| 4,705,161 | 11/1987 | Gozdiff | 198/847 |
| 4,725,473 | 2/1988 | Van Gompel et al. | 428/156 |
| 4,726,985 | 2/1988 | Fay et al. | 428/138 X |
| 4,743,495 | 5/1988 | Lilani et al. | 428/234 |
| 4,746,565 | 5/1988 | Bafford et al. | 428/251 |
| 4,750,443 | 6/1988 | Blaustein et al. | 112/420 |
| 4,759,964 | 7/1988 | Fischer et al. | 428/116 |
| 4,767,687 | 8/1988 | LaBonte | 429/206 |
| 4,770,927 | 9/1988 | Effenberger et al. | 428/245 |
| 4,770,937 | 9/1988 | Yagyu et al. | 428/383 |
| 4,776,602 | 10/1988 | Gallo | 277/233 |
| 4,777,086 | 10/1988 | Madden et al. | 428/457 X |
| 4,786,670 | 11/1988 | Tracy et al. | 524/34 |
| 4,788,088 | 11/1988 | Kohl | 428/34.5 |
| 4,808,465 | 2/1989 | Vane | 428/233 |
| 4,812,145 | 3/1989 | LaBonte | 29/623.1 |
| 4,822,659 | 4/1989 | Anderson et al. | 428/99 |
| 4,824,710 | 4/1989 | Dieul | 428/113 |
| 4,824,726 | 4/1989 | Closson, Jr. | 428/349 |
| 4,833,018 | 5/1989 | Ruehl et al. | 428/332 |
| 4,871,597 | 10/1989 | Hobson | 428/36.1 |
| 4,898,783 | 2/1990 | McCullough, Jr. et al. | 428/408 |
| 4,901,738 | 2/1990 | Brink et al. | 128/849 |
| 4,906,308 | 3/1990 | Mudgett | 156/53 |
| 4,910,361 | 3/1990 | Mudgett | 174/121 |
| 4,915,998 | 4/1990 | Parenti, Jr. et al. | 428/76 |
| 4,916,003 | 4/1990 | LeSech et al. | 428/174 |
| 4,918,281 | 4/1990 | Blair . | |
| 4,925,134 | 5/1990 | Keller et al. | 244/158 |
| 4,926,935 | 5/1990 | Haushalter | 165/185 |
| 4,954,676 | 9/1990 | Rankin | 219/200 |
| 4,966,638 | 10/1990 | Mudgett | 156/51 |
| 4,966,799 | 10/1990 | Lucca et al. . | |
| 4,996,095 | 2/1991 | Behdorf et al. | 428/215 |
| 5,011,743 | 4/1991 | Sheridan et al. | 428/603 X |
| 5,015,824 | 5/1991 | Monter et al. | 219/219 |
| 5,028,474 | 7/1991 | Czaplicki | 428/457 X |
| 5,030,518 | 7/1991 | Keller . | |
| 5,080,949 | 1/1992 | Nawrocki et al. . | |
| 5,108,817 | 4/1992 | Kidd et al. | 428/192 |
| 5,139,839 | 8/1992 | Lim . | |
| 5,167,060 | 12/1992 | Nawrocki et al. . | |
| 5,193,262 | 3/1993 | Hyde et al. . | |
| 5,196,253 | 3/1993 | Mueller et al. . | |
| 5,278,002 | 1/1994 | Hiers | 429/175 |

FOREIGN PATENT DOCUMENTS

| | | |
|---|---|---|
| 0 036 284 | 9/1981 | European Pat. Off. . |
| 0 241 333 | 10/1987 | European Pat. Off. . |
| 0272793 | 6/1988 | European Pat. Off. . |
| 2495875 | 6/1982 | France . |
| 2666717 | 3/1992 | France . |
| 440 728 | 2/1927 | Germany . |
| 548 030 | 4/1932 | Germany . |
| 25 21 136 | 12/1975 | Germany . |
| 71 06 419 | 12/1975 | Germany . |
| 26 06 159A | 3/1977 | Germany . |
| 26 24 634 | 12/1977 | Germany . |
| 26 57 276 | 6/1978 | Germany . |
| 28 54 846 | 8/1979 | Germany . |
| 3122939.5 | 3/1982 | Germany . |
| 3219186A1 | 12/1982 | Germany . |
| 3347619 A1 | 7/1984 | Germany . |
| 8700918.8 | 4/1987 | Germany . |
| 8700919.6 | 4/1987 | Germany . |
| 8709034.1 | 10/1987 | Germany . |
| 8812026 U | 3/1989 | Germany . |
| 3737459 A1 | 5/1989 | Germany . |
| 38 02 993 A1 | 8/1989 | Germany . |
| 3821468 A1 | 12/1989 | Germany . |
| 3825520 A1 | 2/1990 | Germany . |
| 8900894.4 | 7/1990 | Germany . |
| 40 35 117 A1 | 5/1992 | Germany . |
| 48-76280 | 9/1973 | Japan . |
| 50-15454 | 2/1975 | Japan . |
| 56-28856 | 3/1981 | Japan . |
| 58-93685 | 6/1983 | Japan . |
| 63-148082 | 9/1988 | Japan . |
| 3 70 491 | 7/1963 | Switzerland . |
| 988197 | 1/1983 | U.S.S.R. . |
| 126780 | 5/1919 | United Kingdom . |
| 391624 | 5/1933 | United Kingdom . |
| 448007 | 5/1936 | United Kingdom . |
| 471175 | 8/1937 | United Kingdom . |
| 474370 | 10/1937 | United Kingdom . |
| 482747 | 4/1938 | United Kingdom . |
| 783184 | 9/1957 | United Kingdom . |
| 925336 | 5/1963 | United Kingdom . |
| A1072806 | 6/1967 | United Kingdom . |
| 1146710 | 3/1969 | United Kingdom . |
| A1283329 | 7/1972 | United Kingdom . |
| 1432293 | 4/1976 | United Kingdom . |
| A1516197 | 6/1978 | United Kingdom . |
| 2 001 416 | 1/1979 | United Kingdom . |
| 1583744 | 2/1981 | United Kingdom . |
| 2 094 947 | 9/1982 | United Kingdom . |
| WO82/00266 | 2/1982 | WIPO . |
| WO88/03602 | 5/1988 | WIPO . |
| 90/09281 | 8/1990 | WIPO . |

OTHER PUBLICATIONS

Stimpson et al., "Predicting Spacecraft Multilayer Insulation Performance From Heat Transfer Measurements", *ASTM STP 544*, pp. 85–94 (1974).

Swalley et al., "Practical Problems in Design of High Performance Multilayer Insulation Systems for Cryogenic Stages", *Advances in Cryogenic Engineering*, vol. 10, pp. 208–215 (1965).

"German–English Technical and Engineering Dictionary" by Dr. Louis De Vries and Theo M. Hermann, p. 196.

Meyers Lexikon p. 2703.

Oppermann Wöterbuch, p. 371.

Plan Nr. 82449207 (2 drawings) dated Mar. 28, 1988.

Aeronauticos, Universidad Politecnia de Madrid; "Spacecraft Thermal Control Design Data", European Space Agency (TST–02) Issue No. 1; (Oct. 1979).

Kropschot et al., "Multiple–Layer Insulation" *Advances in Cryogenic Engineering*, vol. 5, pp. 189–197 (1960).

Smolak et al., "Analysis of Thermal–Protection Systems for Space–Vehicle Cryogenic–Propellant Tanks" *NASA TR R–130*, (1962).

ADL, "Basic Investigation of Multi–Layer Insulation Systems", *NASA CR–54191*, ADL 65958, (1964).

ADL, "Advanced Studies on Multi–Layer Insulation Systems" *NASA CR–54929*, ADL 67180, (1966).

Coston, R.M., Handbook of Thermal Design Data for Multilayer Insulation Systems, LMSC–A8 47882, vol. II (NAS8–20353) (1967).

Cunnington et al., "Performance of Multilayer Insulation Systems for Temperature to 700° K", *NSAS CR–907* (1967).

Glaser et al., "Thermal Insulation Systems—A Survey", *NASA SP–5027* (1967).

Maccalous, J.W., "Methods of Fabricating Super–Insulation Blankets", *Advanced Techniques for Material Fabrication*, Part II–1A–4; Society of Aeorspace Material and Process Engineers (1968).

Hale, D.V., "Study of Thermal Conductivity Requirements" vol. I, High Performance Insulation Thermal Conductivity Test Program (NAS8–21347) (1969).

Crosby, J.R., "Multilayer Insulation Testing", *JPL Space Programs Summary 37–64*, vol. III, 79–80 (1970).

Knoph et al., "Empirical Thermal Performance of Embossed/Crink Led Aluminized Film Multilayer Insulation with Joints", *Proceedings of the Symposium in Thermodynamics and Thermophysics of Space Flight*, 211–219 (1970).

Leonhard et al., "Multilayer Insulation Materials for Reusable Space Vehicles", *Space Shuttle Materials*, vol. 3, pp. 645–658 (1971).

Holmes et al., "Measurement of Apparent Thermal Conductivity of Multilayer Insulation at Low–Compressive Loads", *Journal of Spacecraft and Rockets*, vol. 9, No. 11, pp. 791–795 (1972).

Stimpson et al., "Effects of Overlaps, Stitches, and Patches on Multilayer Insulation" *Progress in Astronautics and Aeronautics*, vol. 31, pp. 247–266 (1972).

Tien et al., "Lateral Heat Transfer in Cryogenic Multilayer Insulation" *Advances in Cryogenic Engineering*, vol. 18 pp. 118–123 (1972).

Tien et al., "Radiation Heat Transfer in Multilayer Insulation Having Perforated Shields" *AIAA*, Paper No. 73–718 (1973).

"Corrugated Box Manufacturers' Handbook" 3rd Ed. pp. 90–99 (1965).

Klippel et al., "Multilayer Superinsulation Development and Testing" *European Space Research Organization*, Final Report UR–258–74; ESRO CR–(P)–570 (1974).

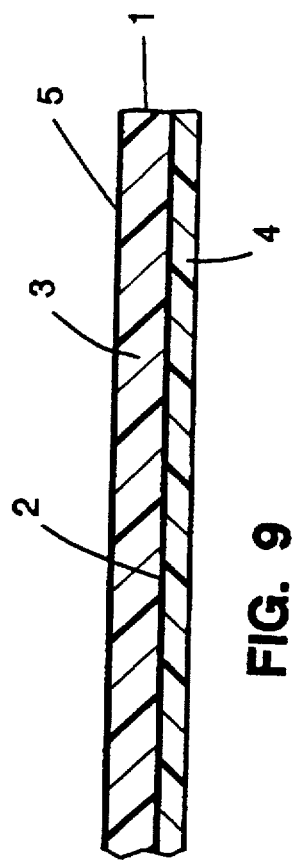
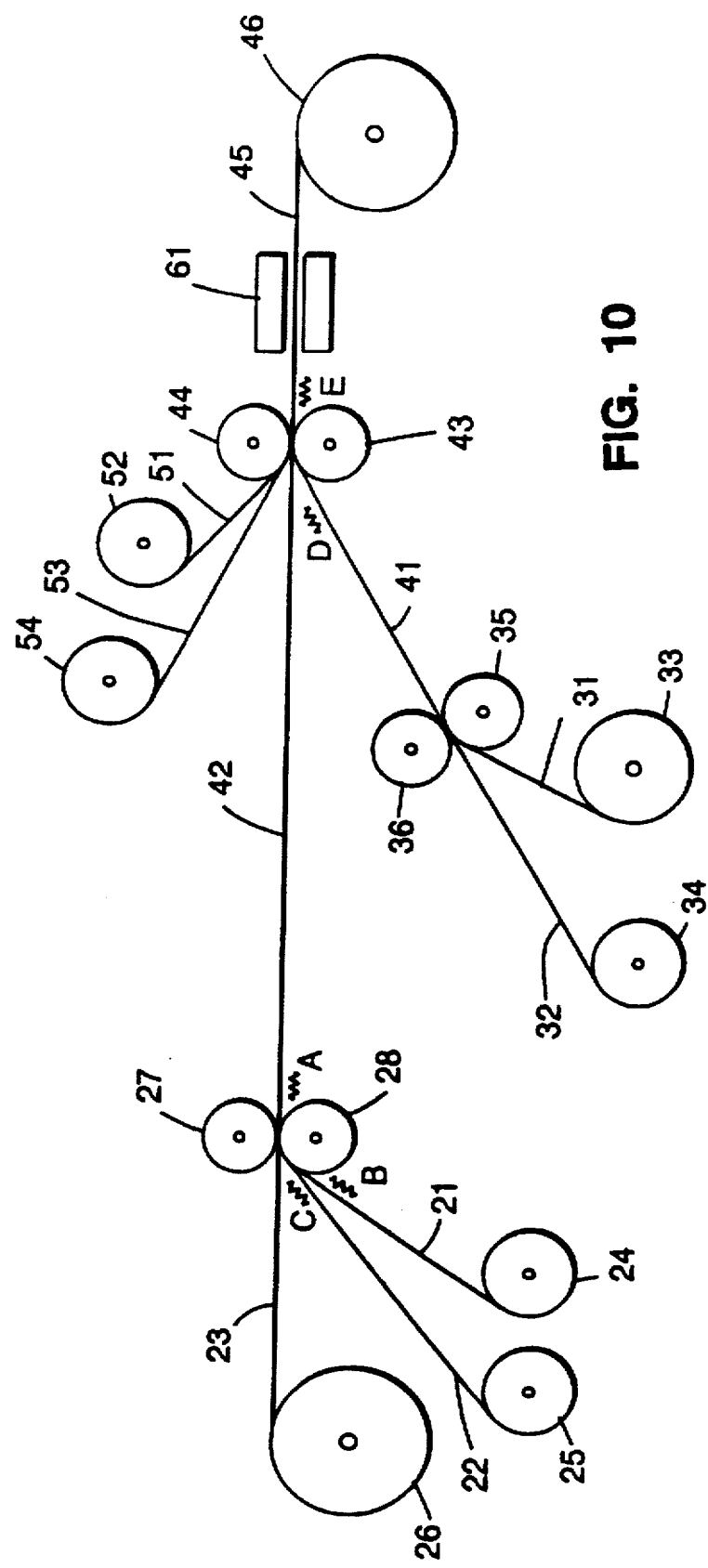
FIG. 9
FIG. 10

PAD INCLUDING HEAT SINK AND THERMAL INSULATION AREA

This application is a continuation of application Ser. No. 08/181,861, filed Jan. 11, 1994, which is a continuation of application Ser. No. 07/542,131, filed Jun. 22, 1990, now abandoned, which is a continuation-in-part of application Ser. No. 07/468,425, filed Jan. 22, 1990, now U.S. Pat. No. 5,011,743, issued Apr. 30, 1991.

FIELD OF THE INVENTION

The present invention relates to a heat insulating pad including heat sink and thermal insulating areas which can be used as a heat reflecting shield as well as a heat sink for dissipating heat at a desired location.

BACKGROUND

Various pads, panels and structural elements have been proposed for heat insulation purposes. For instance, U.S. Pat. No. 2,180,373 ("Sibley et al") discloses a heat insulating panel which includes a metal basket, a heat reflective inner lining covering the inner walls of the basket and a plurality of thin strips of heat reflective material, such as thin aluminum foil, which has been crumpled by hand or any suitable means to form a large number of irregular surfaces which provide point contact between the layers. The thin aluminum foil strips disclosed in Sibley et al can be fastened at each end thereof to the inner lining of the basket and a cover can be provided on the basket to encase the lining and the thin aluminum foil layers therein.

Sibley et al disclose that the inner lining in the baskets serves to reflect the majority of the radiant heat back against the surface on which the insulation is applied resulting in quick preheating or quick cooling of the surface, as desired. Sibley et al also disclose that the inside face of the cover can include a heat reflective surface which will reflect the major portion of the radiant heat that may be carried by convection currents through the surrounding edges of the insulation in the panel back toward its source which effects minimum heat transfer at all joints. Sibley et al also disclose that the heat reflective material should be spaced apart sufficiently to provide heat insulating air spaces between the strips, an air space of approximately ⅜ of an inch being suitable for this purpose. Accordingly, Sibley et al disclose a device which reflects heat back toward its source rather than directing the heat from one portion of the heat insulating panel to another portion thereof to thereby dissipate the heat.

U.S. Pat. No. 1,934,174 ("Dyckerhoff") discloses a heat insulating body which includes a plurality of metal foil sheets which have been stamped, bent or crumpled to form projections which maintain the sheets in point contact when assembled in a stack. Dyckerhoff discloses that the foil can be crumpled or distorted by hand or machine and applied to the surface of the member to be insulated, it being unnecessary to lock these sheets to each other to maintain the irregular shape necessary to provide thick air spaces. Dyckerhoff discloses that the average spacing of the sheets can be about 1 cm but ordinarily will be between 0.5–2 cm, the sheets having a thickness which may be less than 0.2 mm and even as thin as 0.005 or thinner.

Dyckerhoff discloses that a protective casing can be provided to protect the insulation from outside pressures but when the insulation is used for filling air spaces created by the usual structural members, such as walls or ceilings, no special casing is necessary whereas in the case of making pipe coatings, an outside shell which may be made of metal heavier than the foil is advisable. Dyckerhoff discloses that it is not necessary for all of the sheets to be crumpled and the heat insulating body can include an intermediate sheet which remains flat. Dyckerhoff does not disclose any means for directing heat from one part of the insulating body to another part thereof.

U.S. Pat. No. 2,926,761 ("Herbert, Jr."), U.S. Pat. No. 4,343,866 ("Oser et al") and U.S. Pat. No. 4,386,128 ("Yoshikawa") disclose a heat insulating panel comprised of a plurality of thin sheets of metal. None of these references teach or suggest a heat insulating pad or panel which includes means for directing heat from one part to another thereof. U.S. Pat. No. 1,974,665 ("Schnetzer et al"), U.S. Pat. No. 2,441,476 ("Ewald"), U.S. Pat. No. 2,481,046 ("Scurlock"), U.S. Pat. No. 2,963,128 ("Rapp"), U.S. Pat. No. 3,029,910 ("Kirk et al"), U.S. Pat. No. 4,025,996 ("Saveker"), U.S. Pat. No. 4,318,965 ("Blair") and U.S. Pat. No. 4,703,159 ("Blair") disclose structural panels which include a plurality of metal layers which are fastened together. None of these patents teach or suggest a heat insulating pad or panel which includes means for directing heat from one part to another thereof.

SUMMARY OF THE INVENTION

An object of the present invention is to provide a pad including thermal insulation and heat sink areas whereby the pad can be used as a heat reflecting shield as well as a heat sink for dissipating heat at a desired location. The pad can include means for providing shapability to the pad in order to conform the pad to an object around which the pad is located in use.

In accordance with a preferred embodiment of the invention, the pad includes heat sink and thermal insulating areas, the heat sink area conducting a greater amount of heat between opposite surfaces of the pad than does the thermal insulating area. The pad includes a plurality of layers of metal foil forming a stack wherein the layers are arranged one above another in a vertical direction, the stack including at least one heat sink area wherein the layers are closer together in the vertical direction than at at least one insulating area of the stack adjacent to the heat sink area, at least one of the layers including a plurality of embossments therein separating the one layer from an adjacent one of the layers in the insulating area. In particular, the heat sink area can comprise a compressed outer periphery of the stack which extends horizontally in a transverse direction perpendicular to the vertical direction completely around the insulation area, the layers at the outer periphery being secured together by securing means. The pad can include a single insulating area or a plurality of insulating areas and the heat sink area can partially surround an insulating area or can completely surround the insulating area.

In one embodiment of the invention, the layers are in contact with each other in the heat sink area and the securing means comprises a mechanical bond such as staples or other equivalent between the layers in at least part of the heat sink area. In another embodiment, the securing means comprises at least one opening defined by sheared surfaces of the layers, each of the sheared surfaces extending in the vertical direction above and below a plane which is coplanar with facing surfaces of two of the layers. In another embodiment, the securing means comprises frame means for supporting the heat sink area, the frame means comprising an open frame, pan or other suitable equivalent. In a further embodiment, the securing means comprises an adhesive between the layers.

In accordance with the invention, the embossments can be provided in a pattern on only one of the layers or a pattern of the embossments can be provided on at least two of the layers, the layers being arranged such that at least some of the embossments are not aligned in the vertical direction. In one embodiment of the invention, at least two of the layers adjacent to each other include a pattern of the embossments, the layers being aligned in the vertical direction such that at least some of the embossments are aligned in the vertical direction. The embossments can be provided such that on one side of a medial plane passing through the pad face away from the medial plane, the medial plane being perpendicular to the vertical direction. The embossments can also be provided such that at least some of the embossments form depressions on one side of a respective one of the layers and bumps on an opposite side of the respective layer.

In accordance with the invention, at least one of the layers of the pad can include heat radiating means thereon. The heat radiating means can comprise a black surface on at least part of at least one side of at least one of the layers. The black surface can extend over only part of one side of a layer or over the entire surface of the layer. If the pad is used to shield sensitive equipment such as electrical components from a heat source, the insulating area of the pad can be provided such that it faces the heat source and the surface of the insulating area facing the heat source can be a reflective surface. To dissipate heat from the pad, the heat radiating means such as a black surface can be provided on one or more portions of the pad located away from the site which is to be shielded from the heat. For instance, if the outer periphery of the pad or part thereof is located in an area exposed to circulating air which thus would facilitate removing heat from the pad, the pad can include a black coating in such areas. Additionally, the black surface coating can be provided on the individual sheets in any pattern or on any parts thereof which will facilitate removing the heat to the heat sink area or heat sink areas. For instance, if opposite edges of the pad will be located in areas exposed to circulating air, these edges of the pad can be coated with the black surface coating and even the individual layers in such areas can be coated with the black surface coating to facilitate radiation of heat from the pad.

In accordance with the invention, the pad can include at least one layer of scrim. The scrim can comprise a heat resistant material and can be interposed between facing surfaces of two of the layers adjacent to each other. In accordance with the invention, it is not necessary that each of the layers include the embossments. For instance, at least one of the layers can comprise a flat sheet free of the embossments, the flat sheet being interposed between layers having embossments thereon. The embossments can be provided in a uniform pattern on each of the sheets or the pattern can be provided in a non-uniform or random pattern. Furthermore, the embossments can have the same height on all of the sheets or can have varying heights. In addition, the embossments can be provided such that they face the same direction on each of the sheets or the embossments can be provided such that they extend away from only one side of each of the sheets or the embossments can extend away from both sides of at least one of the sheets.

Another object of the invention is to provide a method of making a heat insulating pad having insulating and heat sink areas. The method comprises a step of assembling a plurality of layers of metal foil in a stack wherein the layers are arranged one above another in a vertical direction, at least two of the layers being separated from each other by a plurality of embossments on at least one of the layers and a step of compressing the stack such that heat sink and insulating areas are formed therein and the layers are closer together in the vertical direction in the heat sink area than in the insulating area.

The method of the invention can include a step of embossing a plurality of the layers such that a plurality of the embossments are formed therein, the embossing step being performed by simultaneously embossing a plurality of overlapping sheets of the metal foil, each of the sheets after the embossing step comprising a respective one of the layers. The assembling step can comprise separating the sheets after the embossing step and offsetting them with respect to each other such that at least some of the embossments on two of the sheets facing each other are not aligned in the vertical direction.

In accordance with the method of the invention, a step of securing the layers together in the heat sink area can be provided. The securing step can include hermetically sealing the heat sink area. Alternatively, the step of securing the layers together in the heat sink area can comprise interengaging the layers with each other by forming at least one opening extending in the vertical direction through the layers in the heat sink area, the at least one opening being formed by passing a punch through the layers. The at least one opening can comprise a plurality of openings and the punch can include a plurality of spaced-apart projections, each of which forms a respective one of the openings. The compressing and securing steps can be simultaneously performed with a composite tool comprising a compressible material which performs the compressing step and the punch which performs the securing step, the compressible material and the punch being mounted together in side-by-side relationship.

The method according to the invention can also include a step of cutting the stack. In particular, the cutting step can be performed such that the heat sink area lies between the insulating area and an outer edge of the stack. The cutting step can be performed simultaneously with the compressing and securing steps. In particular, the cutting, compressing and securing steps can be simultaneously performed with a composite tool comprising a compressible material for compressing the layers, a punch for securing the layers and a cutter for cutting the layers, the compressible material being mounted between the cutter and the punch, the compressible material contacting the stack before the cutter and the punch contact the stack during the simultaneously cutting, compressing and securing steps, the compressible material being compressed to a predetermined amount and compressing the stack in the heat sink area when the cutter cuts the stack and the punch punches the at least one opening.

The method according to the invention can include a step of inserting at least one scrim layer in the stack and can include a step of coating at least part of at least one of the layers with heat radiating means, the heat radiating means comprising a black coating and the coating step comprising coating at least part of the heat sink area with the black coating.

In another aspect, this invention is a laminate comprising a first metal foil layer; a first layer of insulating nonwoven fiber material adhesively bonded to the first side of the metal foil; a second layer of insulating nonwoven fiber material adhesively bonded to the second side of the metal foil; and a second metal foil layer in contact with said second layer of insulating material.

In another aspect, this invention is a laminate comprising a first metal foil layer; a layer of a flame retardant nonwoven fiber material adhesively bonded to the first side of the metal foil; a layer of insulating nonwoven fiber material adhesively bonded to the second side of the metal foil; and a second metal foil layer in contact with said second layer of insulating material, wherein the combination of the first metal foil and the layer of flame retardant material prevents damage to the layer of insulating material when the flame retardant side of the laminate is exposed to a 1200° F. flame applied at a 45° angle for ten seconds.

In another aspect, this invention is a method of forming a heat barrier laminate comprising (a) laminating between a first metal foil layer and a layer of heat insulating nonwoven fiber material a first film of thermoplastic adhesive; (b) laminating between the opposite side of the first metal foil and a layer of flame retardant nonwoven fiber material a second film of thermoplastic adhesive; and (c) laminating between the opposite side of the layer of insulating material and a second metal foil layer a third film of thermoplastic adhesive, whereby each film of thermoplastic adhesive is heated sufficiently to cause the adhesive to bond to the metal and fiber layers in contact with the adhesive film.

In another aspect, this invention is a method of forming a heat barrier laminate comprising (a) adhesively bonding together a first metal foil layer and a layer of flame retardant nonwoven fiber material and (b) adhesively bonding together the opposite side of the first metal foil and a layer of heat insulating nonwoven fiber material positioned between the first metal foil and a second metal foil layer.

In another aspect, this invention is a laminate comprising a first metal layer having a layer of nonwoven fiber material bonded to each side of the metal layer and a second metal layer bonded to the exposed surface of one of the layers of fiber material.

In accordance with another embodiment of the invention, a sheet of adhesive coated metal such as aluminum is embossed and/or prescored to allow easy shaping thereof. The sheet can be used as a cover of a pan for holding an insulating pad or it can be used by itself. The adhesive can be coated on one or both sides of the sheet.

BRIEF DESCRIPTION OF THE DRAWINGS

The invention will now be described with reference to the accompanying drawings, in which:

FIG. 9 is a cross section view of a laminate of this invention;

FIG. 10 is a schematic of a process for making laminates of this invention;

DETAILED DESCRIPTION OF THE PREFERRED EMBODIMENTS

According to the invention, a pad 1 is provided which can be used as a heat reflecting shield as well as a heat sink for dissipating heat at a desired location. The pad is particularly useful for providing "hot spot" insulation wherein the pad which is larger than a heat source can be used to shield an area in the vicinity of the heat source by radiating heat back towards the heat source and conducting heat which penetrates the pad to a desired location such as along the outer periphery of the pad. For instance, if a heat source is at a temperature of 250° C. it is possible to reduce the temperature on a side of the pad facing away from the heat source to a lower temperature such as around 50° C. On the other hand, heat which penetrates the pad can be conducted to a heat sink area of the pad. For instance, if the heat sink area is located at the outer periphery of the pad, it is possible to carry heat away from a center zone of the pad. In accordance with the invention, the heat sink area conducts heat from the surface of the pad facing the heat source to the opposite surface with a lower temperature therebetween than in the area of the pad facing the heat source. For instance, the center of the pad can comprise a thermal insulating area with a temperature differential of 200° C. between the surface facing the heat source and an opposite surface of the pad whereas the heat sink area of the pad can have a temperature differential of about 25° C. between the surface of pad facing the heat source and an opposite surface thereof.

Figure 1:
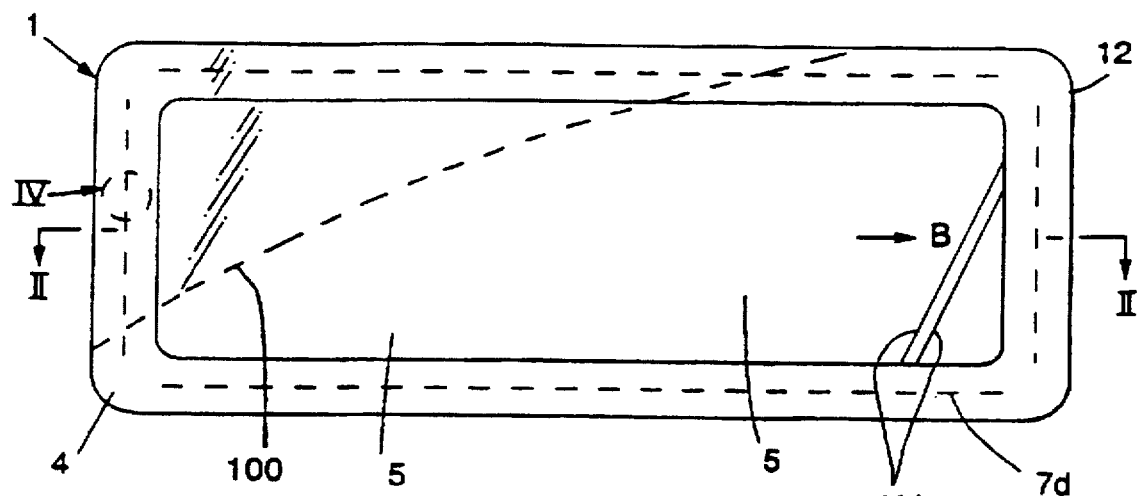
FIG. 1 shows a top view of the pad according to the invention.
Figure 2:
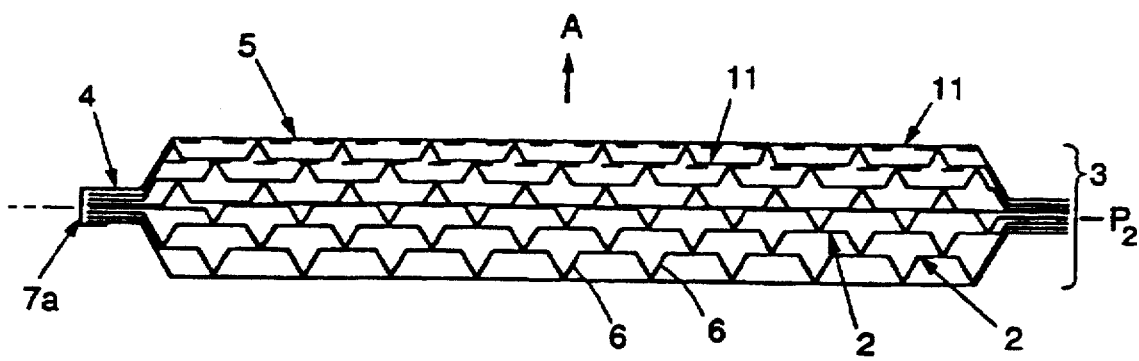
FIG. 2 shows a cross section of the pad shown in FIG. 1 taken along the line II—II.

As shown in FIGS. 1–2, the pad 1 according to the invention includes a plurality of layers 2 of metal foil which makes the pad flexible. The metal foil can comprise aluminum, copper, gold or any other suitable metal or alloy. The thickness of the layers can have any thickness but a thickness of 2 mils has been found satisfactory. The layers, however, can have different thicknesses or the thickness of each layer can be the same. The layers are preferably aluminum foil since the reflectivity of aluminum is on the order of 95% and the emission thereof is on the order of about 10%. The emissivity of the sheets can be dramatically increased, however, by coating the aluminum sheets with a black surface coating. Of course, the reflectivity of the sheets decreases proportionally to the emissivity. Accordingly, the pad 1 of the invention can be designed with a particular use in mind, that is, the layers 2 of the pad can be made brighter at areas which should remain cool and can be made darker at areas where it is desired to radiate heat from the pad.

Figure 3:
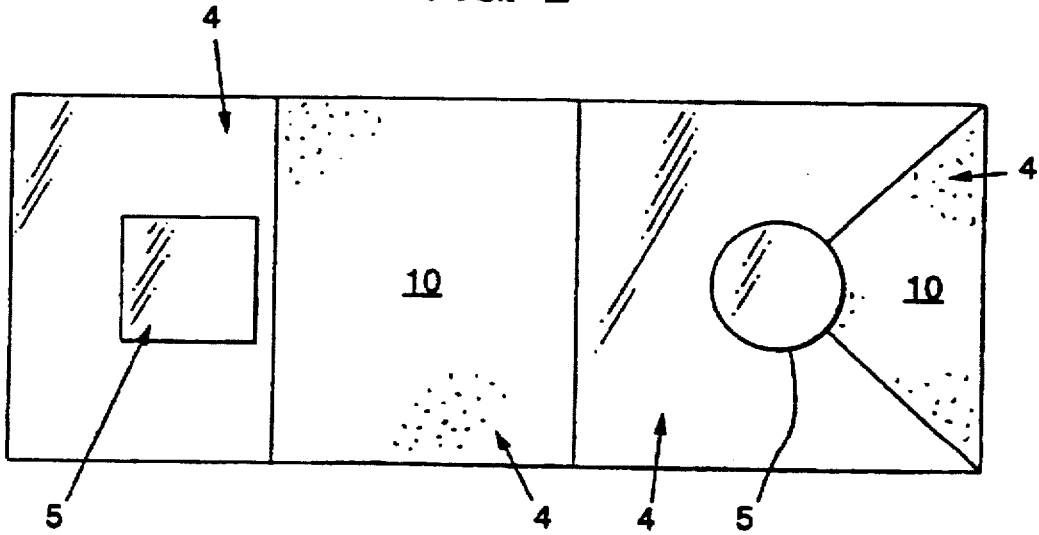
FIG. 3 shows a top view of a pad according to another embodiment of the invention.
Figure 5:
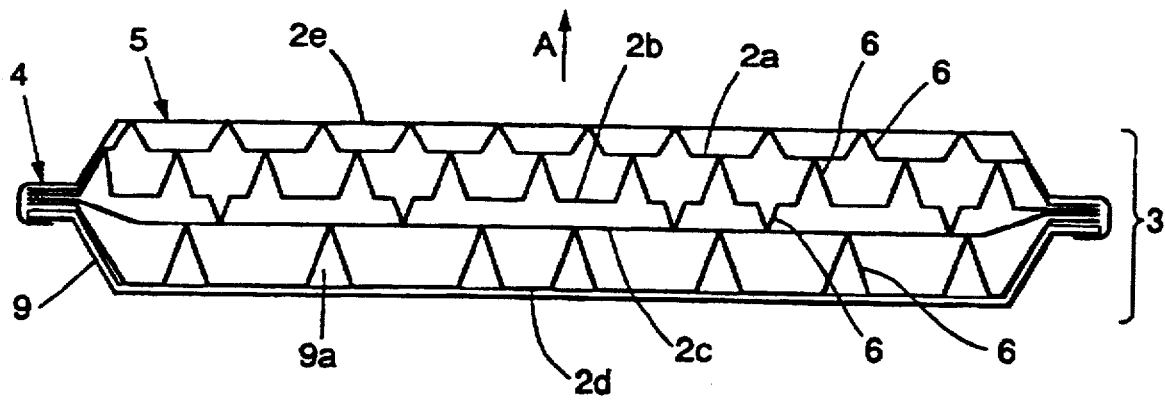
FIG. 5 shows a cross-sectional view of a pad according to another embodiment of the invention.
Figure 6:
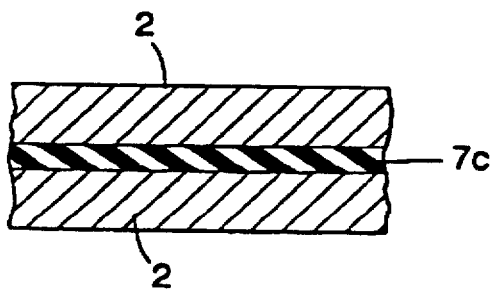
FIG. 6 shows a cross-section of two layers of the pad shown in FIG. 1 with adhesive securing means therebetween.

As shown in FIGS. 2 and 5, the layers 2 are provided in a stack 3 wherein the layers 2 are arranged one above another in a vertical direction A. The stack 3 includes at least one heat sink area 4 wherein the layers are closer together in the vertical direction than at at least one insulating area 5 of the stack adjacent to the heat sink area 4. At least one of the layers includes a plurality of embossments 6 therein separating the at least one layer from an adjacent one of the layers in the insulating area 5. The pad 1 can include a single insulating area 5 as shown in FIG. 1 or a plurality of insulating areas 5 as shown in FIG. 3. The heat sink area 4 can extend completely around the outer periphery of the pad (as shown in FIG. 1) or the outer periphery can be left open in one or more areas. The layers 2 in the heat sink area can be in contact with each other or not in direct contact with each other but the layers 2 in the heat sink area 4 should provide better heat conduction in the vertical direction than at the insulating area.

In a preferred embodiment, the at least one insulating area 5 comprises a single insulating area located centrally in the pad as shown in FIG. 1. In this embodiment, the heat sink area 4 comprises a compressed outer periphery of the stack which extends horizontally in a transverse direction B perpendicular to the vertical direction A completely around the insulating area, the layers at the outer periphery being secured together by securing means 7 and being closer together in the vertical direction at the heat sink area than at the insulating area.

Figure 4:
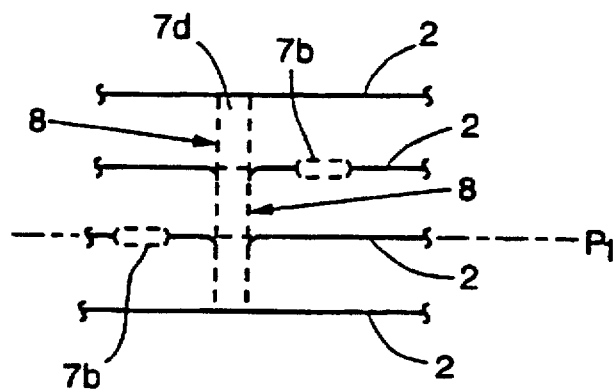
FIG. 4 shows a transverse cross-section of an area of the pad shown at IV in FIG. 1.

The layers 2 in the heat sink area 4 can be interengaged with each other by various securing means 7. For instance, the layers 2 can be in contact with each other in the heat sink area 4 and the securing means 7 can comprise a mechanical bond 7b (as shown in FIG. 4) between the layers in at least part of the heat sink area. The securing means 7 can also comprise adhesive 7c between the layers 2. If adhesive is used to secure the layers together in the heat sink area 4, it is desirable that the adhesive have a thickness of about ½ mils or less so that heat transfer between the layers 2 will not be affected. The securing means 7 can also comprise one or more staples (not shown) for mechanically securing the layers together in the heat sink area 4. As pointed out earlier, the heat sink area can comprise a compressed area of the stack, that is, at least one of the layers 2 can include embossments 6 thereon which are compressed in the heat sink area. In this case, the embossments which are flattened will metallurgically and mechanically bond to the adjacent layer 2. The securing means 7 can also comprise at least one opening 7d defined by sheared surfaces 8 of the layers 2, each of the sheared surfaces 8 extending in the vertical direction above and below a plane $P_1$ which is coplanar with facing surfaces of two of the layers 2. The securing means 7 can also comprise frame means 9 for supporting the heat sink area 4, the frame means including an open frame (not shown) or a pan including a recess 9a therein which receives the stack 3 of sheets 2 as shown in FIG. 5. As shown in FIG. 2, a top sheet of the stack 3 can extend over the outer edges of the sheets 2 in the heat sink area 4, the top sheet including a portion 7a which is crimped or otherwise secured beneath a bottom one of the sheets 2 as shown in FIG. 2. A hermetic seal can be provided around the outer edges of the stack 3 and the interior of the pad can include a gas such as Xenon to provide low heat transfer between the layers 2. Another way of securing the layers in the heat sink area is simply by providing a crimped edge.

The pad 1 can include two layers 2 only one of which includes the embossments 6. In a preferred embodiment, however, at least two of the layers adjacent to each other include a pattern of the embossments 6, the layers 2 being offset with respect to each other such that at least some of the embossments are not aligned in the vertical direction. With this arrangement, the layers 2 can be provided in point contact to minimize heat transfer therebetween in the vertical direction A. The embossments 6 can be provided in uniform patterns or nonuniform patterns on the sheets. Furthermore, the embossments 6 can be provided such that they extend into only one surface of the sheets or the embossments can be provided such that they extend into both surfaces of the sheets as shown by layer 2b in FIG. 5. Layer 2a in FIG. 5 shows a uniform pattern of embossments 6 whereas layer 2b shows a uniform pattern of embossments 6 on one side thereof and a non-uniform pattern of embossments 6 on the other side thereof. Likewise, layer 2d includes embossments 6 in a non-uniform pattern and the embossments 6 on the layer 2d can have a height which is greater than the embossments 6 on the sheet 2a. The layer 2b can include embossments 6 of various heights and one or more layers 2 can be flat such as the layer 2c. In the arrangement shown in FIG. 2, the embossments 6 on one side of a medial plane $P_2$ passing through the pad face away from the medial plane, the medial plane being perpendicular to the vertical direction. The embossments 6 form depressions on one side of a respective one of the layers 2 and bumps or projections on an opposite side of the respective layer.

At least one of the layers can include heat radiating means 10 thereon. The heat radiating means 10 can comprise a black surface on at least part of at least one side of at least one of the layers. For instance, the heat sink area 4 can be coated with the black surface 10 or various parts of the pad 1 can include the black surface 10 as shown in FIG. 3. As mentioned earlier, the black surface allows the pad 1 to radiate 95% of the heat whereas if the aluminum foil remains bright only 10% of the heat is radiated. Accordingly, the black coating 10 can be provided in areas at which it is desired to radiate heat away from the pad. As an example, if one side of the pad faces a heat source it would be desirable to leave that surface bright to reflect heat back towards the heat source and if a heat sensitive component was located on the opposite side of the pad it would be desirable to leave that surface bright also to prevent heat from radiating towards the component. On the other hand, if the outer edges of the pad are located in an area at which air freely circulates, it would be desirable to compress the pad in those areas to provide heat sink areas 4 and provide the black coating thereon to enhance dissipation of heat from the pad in those areas. If one surface of the pad faces a heat source and the opposite side of the pad faces an open area at which a heat sensitive component is not located, it may be desirable to coat the entire surface of the pad facing away from the heat source. Furthermore, one or more of the interior layers of the pad can be coated with the heat radiating means 10 in any desired pattern on one side or both sides thereof. The coating 10 thus cooperates with the heat sink area 4 to direct heat to a desired area on the pad. Typically, the coating 10 can be provided on the lower layers of the pad facing the heat source and will extend to the heat sink area 4 to conduct heat away from the heat source.

The pad can also include at least one layer of scrim 11 as illustrated in FIG. 2. As shown in FIG. 2, adjacent layers 2 of the metal foil are not metallurgically bonded to each other in the heat insulating area 5 due to the presence of the scrim layer 11. The scrim can comprise a heat resistant material such as flame retardant polyester ("FRPE"). The scrim is typically about one mil or less in thickness and of a fabric material. The scrim 11 can be provided within 1-2 layers of the top of the pad. Furthermore, the scrim can comprise refractory paper, a fiberglass non-woven fabric, a ceramic non-woven fabric or other suitable material.

In accordance with a preferred embodiment of the invention, the foregoing pad can be made by the steps of assembling a plurality of layers 2 of metal foil in a stack 3 wherein the layers are arranged one above another in a vertical direction A, at least two of the layers being separated from each other by a plurality of embossments 6 on at least one of the layers and a step of compressing the stack such that heat sink 4 and insulating areas 5 are formed therein with the layers being closer together in the vertical direction in the heat sink area 4 than in the insulating area 5.

The method according to the invention can also include a step of embossing a plurality of the layers 2 such that a plurality of the embossments 6 are formed therein, the embossing step being performed by simultaneously embossing a plurality of overlapping sheets 2 of the metal foil, each of the sheets after the embossing step comprising a respective one of the layers. The embossments can be provided in a random or uniform repeating pattern. It is also within the scope of the invention to emboss each sheet separately. The embossments can be provided by passing a single sheet or a stack of sheets between a pair of rollers having the desired embossment pattern thereon. The embossments can have the same heights or varying heights on individual sheets or the sheets can be provided such that one sheet has embossments having a height greater than the embossments on another sheet. The embossments can extend outwardly from only one side of the sheet or can extend outwardly from both sides of the sheet. The preferred metal foil used for each layer is aluminum having a thickness of about 2 mils but the thickness of the sheets can be adjusted to suit the needs of the pad. For instance, thicker sheets provide better lateral heat transfer. It is also within the scope of the invention to provide sheets which are thicker in parts thereof at which better lateral heat transfer is desired.

The method of the invention can also include a step of securing the layers together in the heat sink area 4. The securing step can include hermetically sealing the heat sink area, stapling the heat sink area with one or more staples, crimping the layers along the heat sink area, providing a mechanical bond in the heat sink area and/or by metallurgical bonding of the individual layers to each other (such as by ultrasonic welding which causes the Al oxide layer on the aluminum to be removed and the individual layers to be bonded to each other), applying an adhesive between the layers in the heat sink area, and/or any other suitable securing means. If the pad is hermetically sealed, a low heat transfer gas such as Xenon can be provided between the layers in the insulating area 5.

Figure 8:
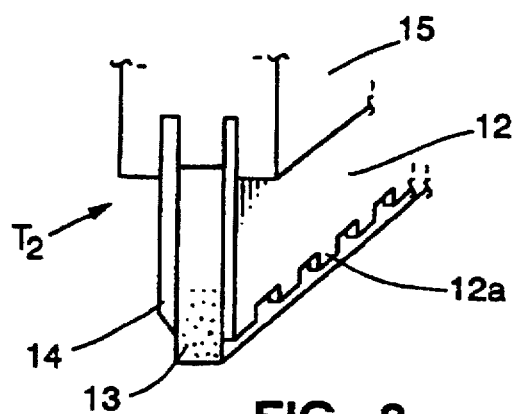
FIG. 8 shows a perspective view of a composite tool comprising a cutter, a compressible material and a punch having a plurality of spaced-apart teeth used for simultaneously cutting the outer edge of the pad, compressing the pad to form the heat sink area and securing the layers of the pad together in the heat sink area.

In accordance with a preferred embodiment of the method of the invention, the step of securing the layers together in the heat sink area can comprise interengaging the layers with each other by forming at least one opening 7d extending in the vertical direction through the layers in the heat sink area, the at least one opening 7d being formed by passing a punch 12 through the layers. The at least one opening 7d can comprise a plurality of openings as shown in FIG. 1. The punch can include a plurality of spaced-apart projections or teeth 12a, each of which forms a respective one of the openings 7d. The compressing and securing steps can be simultaneously performed with a composite tool $T_2$ comprising a compressible material 13 which performs the compressing step and the punch 12 which performs the securing step, the compressible material 13 and the punch 12 being mounted together in side-by-side relationship as shown in FIG. 8. The compressible material can comprise an elastomeric material such as a natural on synthetic rubber or a spring loaded metal part such as a metal ring.

Figure 7:
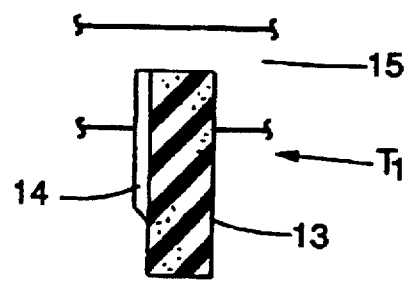
FIG. 7 shows a composite tool comprising a cutter and a compressible pad for simultaneously compressing the heat sink area and cutting an outer edge of the pad.

In accordance with another preferred embodiment of the method according to the invention, a step of cutting the stack 3 can be provided such that the heat sink area 4 lies between the insulating area 5 and an outer edge 1a of the stack 3. The cutting step can be performed as a separate step or simultaneously with the compressing step or simultaneously performed with the compressing and securing steps. For instance, the cutting step can be performed with a tool $T_1$ comprising a cutter 14 mounted in side-by-side relationship with the compressible material 13 on a suitable holder 15, as shown in FIG. 7. With this arrangement, the compressible material 13 will strike the stack 3 prior to contact therewith with the cutter 14, the compressible material 13 will deform as it compresses the stack to form the heat sink area 4 and then the cutter 14 trims the outer edge 1a of the pad 1. In the case where the cutting, compressing and securing steps are simultaneously performed, the composite tool $T_2$ shown in FIG. 8 can be used. As shown in FIG. 8, the composite tool $T_2$ includes the punch 12 having the spaced-apart projections 12a, the compressible material 13 and the cutter 14, all of which are mounted in side-by-side relationship. With the tool $T_2$, the cutting, compressing and securing steps can be performed such that the compressible material 13 contacts the stack 3 before the cutter 14 and the punch 12 contact the stack during the simultaneous cutting, compressing and securing steps, the compressible material 13 being compressed to a predetermined amount and compressing the stack 3 in the heat sink area 4 when the cutter 14 cuts the stack and the punch 12 punches the openings 7d.

Also in accordance with the method of the invention, a step of inserting at least one scrim layer 11 in the stack 3 can be provided. In this case, one or more layers of scrim 11 can be provided between individual layers 2 of the stack 3.

Also in accordance with the method of the invention, a step of coating at least part of at least one of the layers 2 with heat radiating means 10 can be provided. The heat radiating means 10 preferably comprises a black coating and the coating step can comprise coating at least part of the heat sink area with the black coating 10. However, various parts of the individual layers 2 or outer surfaces of the pad 1 can be coated with the heat radiating means 10 depending on the desired heat transfer characteristics of the pad.

EXAMPLE 1

A pad in accordance with the invention includes five layers of aluminum foil, the top and bottom layers being 2 mils (0.002") in thickness and the three intermediate layers being 0.8 mils (0.0008") in thickness. The overall size of the pad is 12" wide by 20" long and the pad is about 5 mm in thickness. The heat sink area can be 3–10 mm in width, e.g. 6 mm. The embossments are about 1 mm in height and the pad can be protected by a pan having a thickness of about 20 mils (0.02"). The top sheet can extend over the edges of the pan to hold the pad in a recess in the pan. The pan is useful for protecting the pad from rocks, etc. if the pad is mounted on the underside of a vehicle.

According to another aspect, the laminates of this invention comprise a first metal layer between two insulating layers and a second metal layer on the outside surface of one of the insulating layers. In its preferred form the layer of insulating material on the opposite side from the second metal layer is a flame retardant material. Thus, the preferred laminates of this invention have one surface which is a layer of flame retardant fiber material and the other surface is a metal layer. Between these two surface layers are the other layer of metal and the other layer of insulating material.

It has been found that the combination of a thin layer of flame retardant material with a thin metallic layer, which has high heat conductivity, provides unusually effective high temperature protection for ordinary insulation material. This combination enables the use of such insulation materials in higher temperature applications than they can normally be used, especially in "spot" insulation applications.

An example of such spot insulation use is in the automotive area where it is desired to shield the floor of the passenger compartment of the automobile from the heat generated under the floor by the exhaust system, particularly from the muffler and/or catalytic converter, which may be positioned closer to the floor than the exhaust pipes in general. The flame retardant layer and metal layer combination in the laminates of this invention provide a surface for the laminate which is durable under exposure to the severe heat conditions and which is effective in protecting the insulating layer from degradation. The metal layer component in the laminate of this invention makes this laminate particularly effective in "spot" heat barrier applications, because the metal layer tends to conduct the heat from the hot spot area and dissipate the heat more uniformly over a larger surface area, thereby protecting the insulating layer and making the insulating layer more effective. This also makes the heat barrier laminates of this invention more effective for more applications.

It has been found particularly advantageous to have the metal surface layer of the laminates of this invention in combination with the metal layer which is embedded between the two insulation layers. The combination of the two metal layers provides superior heat shielding and heat dissipation, particularly suitable in automotive spot insulation applications. For example, in such use the laminate of this invention is positioned such that the flame retardant surface layer is placed on the metal floor of the passenger compartment and the metal surface layer is on top. The carpet pad or carpet of the passenger compartment is placed on the metal surface layer of the laminate of this invention. In this position, the laminate of this invention provides superior performance as a spot insulator for a given thickness and weight, compared to other types of insulation.

In this particular use, it has been found preferable to have the laminate of this invention to be from about 25% to about 75% of the total thickness of this laminate plus the floor carpet. More preferably this laminate will be from about 40% to about 60% of the total thickness and most preferably about 50%.

While the laminates of this invention are discussed and described herein as a "heat barrier" laminate, it is to be understood that the laminates of this invention also have surprisingly effective acoustical properties. Thus, the laminates of this invention can be designed for a desired temperature difference ($\Delta T$) and for a desired decibel difference ($\Delta db$) from one side of the laminate to the other. It is believed that the metal layer in the laminate of this invention provides unexpected sound and vibration damping, because it is adhesively bonded to the two nonwoven fiber mats. The metal layer prevents sound from traveling through the fiber mats, and the vibration energy imparted to the metal layer is dissipated in the mats to which it is bonded. As will be apparent, for pure acoustical uses, where heat is not a factor, it is not required to have a flame retardant layer; a nonflame retardant nonwoven fiber mat is suitable.

In general, the laminates of this invention can be any desired overall thickness depending on the insulation ($\Delta T$) values desired and/or the sound insulation ($\Delta db$) values desired. Likewise, the relative thickness of the fiber mat on one side of the metal layer compared to the fiber mat on the other side of the metal layer will be variable according to the end properties desired in the laminate. Cost of the respective layers will frequently be a determining factor as well as physical properties.

The overall thickness of the laminate as well as the thicknesses, density, and other properties of each layer will be a matter of selection and choice by one skilled in the art following the disclosure herein and depending on the final properties desired for the laminate for a particular end use application. These factors will vary depending on whether the end use application is for heat barrier or sound barrier or both. For example, using a 1 mil aluminum foil with 0.1 in. aramid nonwoven fiber mat on one side and polyester nonwoven fiber mat on the other side, a 0.75 in. laminate may provide a $\Delta T$ of about 120° F. while a 0.375 in. laminate may provide a $\Delta T$ of about 100° F. between an automotive exhaust and the floor of the passenger compartment. It will also be recognized by those skilled in the art that the layers in the laminates of this invention may be multiple layers to provide desired properties following the disclosure herein.

In a preferred aspect, this invention provides thin, lightweight heat barrier laminates which are less than about 1 inch in thickness and less than about about 5 lb/ft$^3$ in weight. More preferably the laminate will be less than ¾ in. thick and more preferably less than ½ or ⅜ in. thick. Likewise, a more preferred weight will be in the range of about 3 to about 4 lb/ft$^3$, or less. The flame retardant layer is preferably about 0.1 in. or less in combination with the metal layer which is preferably about 0.005 in. or less in thickness. The insulating layer will constitute the balance of the total laminate thickness. More preferably, the flame retardant layer is less than about 0.08 in. and most preferably in the range of about 0.03 to about 0.06 in. The metal layer is preferably a metal foil, which provides flexibility for manufacturing and for end use applications, having a thickness less than about 0.003 in., more preferably less than about 0.002 in. and most preferably for many end use applications has a thickness in the range of about 0.001 in. to about 0.0015 in.

Materials which are preferred for the laminates of this invention include aluminum foil for the metal layer and aramid nonwoven fiber batt for the flame retardant layer. The insulating layer is preferably a polyester or fiber glass nonwoven batt. The layers of the laminate may be bonded or adhered together in any manner desired for any particular end use application of the laminate. It is preferred to avoid puncturing or tearing the metal foil thus retaining the integrity of the lateral heat conductivity of the metal layer.

While the outside surface metal layer is preferably adhesively bonded to the insulating material layer, it is not necessary that the surface metal layer be adhesively bonded thereto. This metal layer merely needs to be in thermal contact with the insulating material layer and may be held in place by any desired means. In one configuration, this metal layer can actually be attached to the bottom of the floor carpet of an automotive passenger compartment and is thereby placed in contact with the insulating layer to form the laminate of this invention when the carpet is installed on top of the insulating layer which has the other metal layer and the fire retardant material layer on the other side thereof.

The layers of the laminate are preferably bonded with an adhesive which is appropriate for the temperature ranges in which the laminate is to be used. The adhesive may be applied as a liquid or solid, which may be sprayed as a liquid or powder on the surface of the fiber batts and/or the metal foil to bond the fiber materials to the metal foil. However, a preferred adhesive is a thermoplastic adhesive supplied in the form of a sheet or film, typically about 0.0015 in. in thickness, for example the thermoplastic adhesive film available from DuPont under the designation or trademark "Surlyn". The advantages of using the adhesive in the form of a film will be readily apparent to one skilled in the art of manufacturing laminates. The adhesive film can be fed from a roll and positioned between the metal foil and the fiber batt, then heated and pressed at the appropriate temperature and pressure to melt or flow the adhesive to bond the fiber batt to the metal foil. This film or sheet form of adhesive provides the process advantages of being easy to use, providing a uniform layer of adhesive and having no solvents or airborne particles present during the laminating processes.

FIG. 9 is a cross sectional view of a typical laminate in accordance with this embodiment of the present invention. Laminate 16 comprises metal layer 17 having adhesively bonded to one side of the metal layer an insulating layer 18. To the other side of metal layer 17 is adhesively bonded flame retardant layer 19. Second metal layer 20, in this embodiment, is bonded to insulation layer 18.

As indicated above, the method of attaching the insulating layer and/or the flame retardant layer to the metal layer can be done by any desirable means, but the most economical and convenient means is by adhesive means which may be liquids or solids and may be thermoplastic or thermoset adhesives, as well as catalytically cured adhesive systems including air or moisture cure adhesive systems. The relative thicknesses of the three layers comprising the laminate of the present invention, are discussed above and can be adjusted by one skilled in the art to meet the desired performance requirements of any particular end use application for which the heat barrier laminate of the present invention is intended to be used.

FIG. 10 illustrates one embodiment of a manufacturing method for forming the laminate of the present invention. Other embodiments and variations thereof within the scope or teaching of this invention will be apparent to one skilled in the art. In the particular embodiment illustrated in FIG. 10, aluminum foil 21 is fed from roll 24 along with adhesive film 22 from roll 25 and a polyester or fiberglass nonwoven mat 23 from roll 26 are all fed between laminating rolls 27 and 28 which press and laminate the three layers such that the adhesive 22 bonds the fiber mat 23 to aluminum foil layer 21. Heat can be applied by laminating rolls 27 and/or 28 or heat can be applied in areas D and/or E in order to provide the required heat and temperature level to cause adhesive 22 to effectively melt or flow sufficiently to bond aluminum layer 21 to fiber mat layer 23. Alternatively, heat maybe applied in area C to effect or assist in the bonding of the adhesive between the metal and fiber layers.

The aluminum foil-adhesive-insulating fiber mat laminate 42 is then fed to laminating rollers 43 and 44 along with heat retardant fiber mat layer 41, which in this embodiment has a layer of adhesive already laminated to the surface of the flame retardant fiber mat which will contact the aluminum layer 21 of previously formed laminate 42. The adhesive layer between the aluminum foil layer and the flame retardant fiber mat may be supplied separately as adhesive 22 is supplied in the first step.

However, in some instances it may be preferred, as shown in FIG. 2, to form laminate 41 which is a combination of flame retardant fiber mat 31 such as aramid fibers, fed from roll 33 along with adhesive film 32, such as the "Surlyn" thermoplastic adhesive available from DuPont, fed from roll 34. Fiber mat 31 and adhesive 32 are heated and laminated together in laminator rolls 35 and 36 to form laminate 41. Laminate 41 is in turn fed along with laminate 42 to laminating rolls 43 and 44 with heat applied in areas F and/or G to bond the fiber mat 31 to aluminum layer 21. The second aluminum foil layer 51 is fed from roll 52 along with adhesive 53 from roll 54 to rollers 43 and 44 to be contacted with laminate 42, thus producing final laminate 45 of this invention, which is rolled on roll 46. The bonding of the second aluminum layer 51 to the insulation layer 42 can be done with heated roller 44, heat applied to the top areas similar to the way areas F or G, and/or heat can be applied by oven 61. In some applications, the oven 61 alone may be desirable so that rollers 44 and 43 do not compact or distort the laminate structure before adhesives 53 and/or 32 are set.

The final laminate of the present invention can then be cut, slit or die-cut to form the various shapes desired for heat and/or sound barrier and/or insulating layers for particular end use applications. The speed or lamination and the temperatures used in the laminating process will depend on the particular materials and particularly the adhesive material used.

Alternative to the embodiment shown in FIG. 10, the adhesive may be a liquid adhesive which is sprayed between layers to effect the desired bonds between the respective fiber layers and the aluminum foil layer. Or the adhesives can be other forms, such as powders, and can be combinations of film, liquid, etc.

The laminates of this invention are particularly useful for products which meet the Federal Automotive Standard 302 for flame retardant requirements for automotive insulation. The flame retardant layer of nonwoven fiber mat useful in this invention can be flame retardant fibers or can be other fibers treated with a flame retardant material.

To provide greater flexibility to the pad 1 shown in FIG. 1, perforations 100 can be provided to allow the pad to bend easier. Such perforations 100 can extend completely through the thickness of the pad. For instance, a punch which includes a row of spaced-apart blades of about 0.010 inch in thickness and about 0.25 inch in length (in a direction parallel to the row of blades) can be used to create the perforations in the pad. The perforations 100 can be provided in any configuration such as a straight line (not shown), a curved line such as is shown in FIG. 1 or a plurality of straight and/or curved lines (not shown). Although such blades are about 0.010 inch in thickness, the slits formed in the pad are actually only a couple of thousands of an inch wide. With such perforations, it is easy to bend/fold/conform the pad shown in FIGS. 1 and 5 to fit around various shaped objects. The perforations can be arranged in a pattern adapted to the shape of the object around which the pad is to be used. A pattern of indentations 101, used to provide additional flexibility and shapability to the pad 1, is shown in FIG. 1.

The top layer or sheet 4 which is of metal such as thin aluminum sheet can be used to cover a pan 9 (as shown in FIG. 5) or it can be used separately. To improve the strength of the sheet 4, it can be coated on one or both sides with adhesive, such as the SURLYN thermoplastic adhesive described earlier. When the adhesive coated sheet 4 is heated, such as at 250° F., the sheet 4 can be bonded to a desired object such as the pan 9 shown in FIG. 5. In this case, the pad is placed in the pan, the layer 4 is fitted over the pan and outer portions of the layer 4 are bent around the corners of the pan after which the assembly is heated to bond the layer 4 to the pan 9. The provision of the adhesive coating significantly improves the tear resistance of the sheet 4, especially at edge portions thereof. The adhesive coated sheet 4 can be used in environments heated to elevated temperatures such as 270° C. without causing damage to the adhesive coating.

Figure 11:
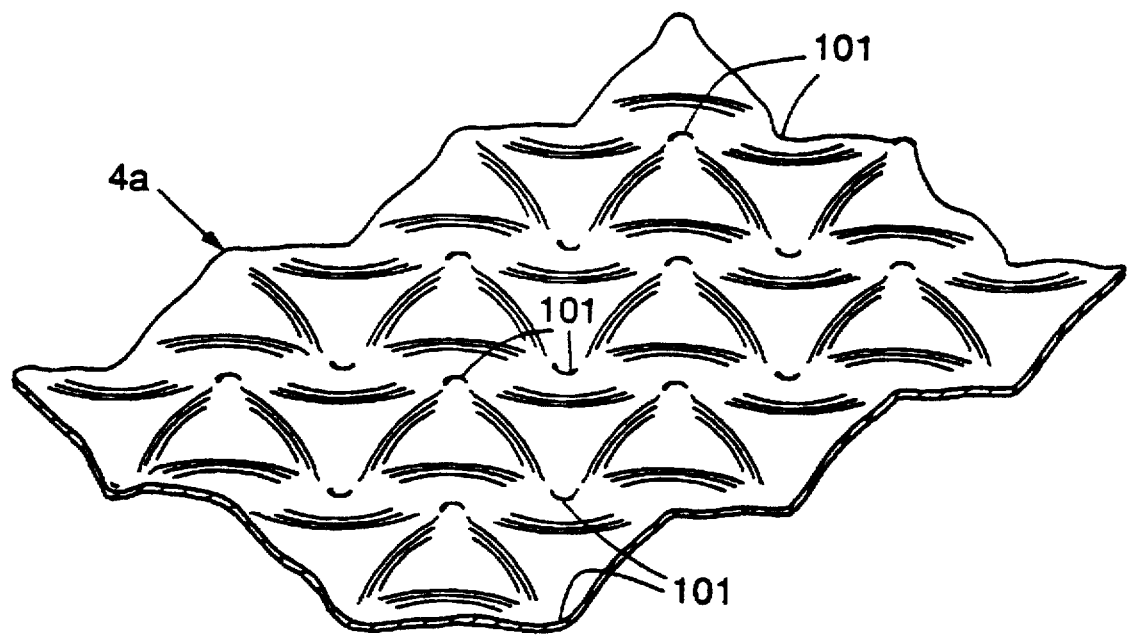
FIG. 11 is a perspective view of a shapable laminate in accordance with the invention.
Figure 12:
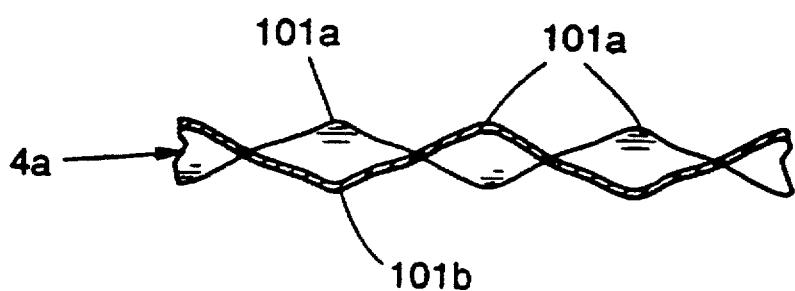
FIG. 12 is a cross-section of the laminate shown in FIG. 11.

To improve bendability of the layer 4 with or without the adhesive described above, it can be provided with an embossed pattern, such as shown in FIGS. 11 and 12. In this case, the sheet 4a can include a diamond shaped cross-hatching pattern which allows the sheet 4a to be stretched and compressed as needed when fitting the sheet around an object. As shown in FIGS. 11 and 12, the embossed pattern includes a plurality of hills and valleys extending between upper and lower points 101. These points 101 can be spaced apart randomly, at equal distances or in repeating patterns such as ½ inch in one direction and ⅜ inch in another direction. The depth between an uppermost point 101a and a lowermost point 101b can be about 1 mil for an aluminum foil sheet having a thickness of 2 mils.

The sheet 4a can be provided with the perforations 100, embossments or other suitable means such as wrinkling or dimpling increasing shapability thereof. For instance, a plurality of creases or ridges could be provided in the sheet such as in the shape of corrugations or other shapes. If an embossed repeating pattern is used, it can be provided by means of a suitably shaped embossment roller which presses the sheet 4a against a roller having a soft surface. Alternatively, a pair of embossment rollers having patterns of corresponding embossments could be used.

Having described the present invention in the above descriptions and illustrated the present invention in the embodiments illustrated in the attached drawings, variations of the present invention will be apparent to one skilled in the art following the teachings contained herein. The scope of the present invention is reflected by the following claims.

What is claimed is:

1. A pad including at least one compressed portion forming a heat sink area and at least one thermal insulating area, comprising:
   a plurality of interior layers of metal foil between a top layer and a bottom layer of metal foil forming a stack wherein said layers are arranged one above another in said at least one compressed portion forming the heat sink area and in said at least one thermal insulating area, at least one of said layers including plurality of embossments therein separating said at least one of said layers from an adjacent one of said layers in said at least one insulating area so as to provide a gap therebetween, the layers being secured together by securing means at said at least one compressed portion of the stack, one of the layers in said at least one insulating area being adjacent to and not metallurgically bonded to another one of the layers in said at least one insulating area.

2. The pad of claim 1, wherein said pad includes shapability means in the form of perforations in the pad for providing shapability to the pad.

3. The pad of claim 2, wherein said perforations extend completely through said pad.

4. The pad of claim 1, wherein said pad includes shapability means in the form of at least one indentation in the pad for providing shapability to the pad.

5. The pad of claim 4, wherein the at least one indentation is provided at least along said at least one thermal insulating area of the pad.

6. The pad of claim 1, wherein the compressed portion of the stack is a heat sink area wherein the layers provide better heat conduction through the pad than at the insulating area.

7. The pad of claim 2, wherein the shapability means comprises at least one row of perforations in the pad.

8. The pad of claim 4, wherein the shapability means comprises at least one row of indentations in the pad.

9. A pad, including at least one compressed area forming a heat sink area and at least one thermal insulating area, comprising:
   a plurality of interior layers of metal foil arranged one above another in said compressed area forming said heat sink area and in said thermal insulating area between a top layer and a bottom layer of metal foil, at least two of said layers being separated in said insulating area so as to provide a gap therebetween, one of said layers in said insulating area being adjacent to and not metallurgically bonded to another one of said layers in said insulating area, and said layers being secured together by securing means in said compressed area.

10. The pad of claim 9, wherein said compressed area forming said heat sink area provides better heat conduction in the transverse direction than said insulating area and is located to dissipate heat from the pad.

11. The pad of claim 9, wherein medial lines through each layer of said at least two separated layers are substantially parallel.

12. The pad of claim 9 wherein said pad includes shapability means in the form of at least one indentation in the pad for providing shapability to the pad.

13. The pad of claim 9 wherein said pad includes shapability means in the form of perforations in the pad for providing shapability to the pad.

14. The pad of claim 1 wherein the top layer of metal foil is about 2 mils (0.002 in.) in thickness.

15. The pad of claim 1 wherein the bottom layer of metal foil is about 2 mils (0.002 in.) in thickness.

16. The pad of claim 1 wherein the interior layers of metal foil are each about 0.8 mils (0.0008 in.) in thickness.

17. The pad of claim 1 comprising three interior layers and wherein the overall thickness of said at least one thermal insulating area is about 5 mm.

18. The pad of claim 1 further comprising a frame for supporting at least one compressed portion of the stack.

19. The pad of claim 1 further comprising a pan for supporting at least one compressed portion of the stack.

20. The pad of claim 19 wherein the pan has a thickness of about 20 mils (0.02 in.).

21. The pad of claim 19 wherein the top layer extends over the edges of the pan to hold the pad in a recess in the pan.

22. The pad of claim 1 wherein the top layer extends over the outer edges of the interior and bottom layers and beneath the bottom layer and is secured beneath the bottom layer.

23. The pad of claim 1 wherein the at least one thermal insulating area provides a reduction in temperature to about 50° C. on a side of the pad facing away from a heat source when the heat source is at a temperature of about 250° C.

24. The pad of claim 1 wherein the at least one thermal insulating area provides a temperature differential of 200° C. between a surface of the pad facing a heat source and an opposite surface of the pad and the at least one compressed portion provides a temperature differential of about 25° C. between the surface of the pad facing the heat source and the opposite surface of the pad.

25. The pad of claim 1 wherein said securing means comprises interengaging the layers with each other.

26. The pad of claim 9 wherein at least two of said interior layers being separated in said insulating area so as to provide a gap therebetween.

27. The pad of claim 9 wherein the top layer of metal foil is about 2 mils (0.002 in.) in thickness.

28. The pad of claim 9 wherein the bottom layer of metal foil is about 2 mils (0.002 in.) in thickness.

29. The pad of claim 9 wherein the interior layers of metal foil are each about 0.8 mils (0.0008 in.) in thickness.

30. The pad of claim 9 comprising three interior layers and wherein the overall thickness of said at least one thermal insulating area is about 5 mm.

31. The pad of claim 9 further comprising a frame for supporting at least one compressed portion of the stack.

32. The pad of claim 9 further comprising a pan for supporting at least one compressed portion of the stack.

33. The pad of claim 32 wherein the pan has a thickness of about 20 mils (0.02 in.).

34. The pad of claim 32 wherein the top layer extends over the edges of the pan to hold the pad in a recess in the pan.

35. The pad of claim 9 wherein the top layer extends over the outer edges of the interior and bottom layers and beneath the bottom layer and is secured beneath the bottom layer.

36. The pad of claim 9 wherein the at least one thermal insulating area provides a reduction in temperature to about 50° C. on a side of the pad facing away from a heat source when the heat source is at a temperature of about 250° C.

37. The pad of claim 9 wherein the at least one thermal insulating area provides a temperature differential of 200° C. between a surface of the pad facing a heat source and an opposite surface of the pad and the at least one compressed portion provides a temperature differential of about 25° C. between the surface of the pad facing the heat source and the opposite surface of the pad.

38. The pad of claim 9 wherein said securing means comprises interengaging the layers with each other.

39. A method of making a pad having at least one compressed area forming a heat sink area and at least one thermal insulating area, comprising:

assembling a plurality of interior layers of metal foil arranged one above another between a top layer and a bottom layer of metal foil to form a stack of metal foil layers, at least two of said layers being separated so as to provide a gap therebetween to form said insulating area;

compressing at least a portion of said stack to form said compressed heat sink area adjacent to said insulating area; and securing said layers together in said compressed area.

40. The pad of claim 39 wherein the at least two of said layers being separated comprise at least two of said interior layers.

41. The method of claim 39 further comprising securing said layers together by interengaging the layers with each other in said compressed area.

42. The method of claim 39 further comprising cutting the stack to provide a compressed area between an insulating area and an outer edge of the stack.

43. The method of claim 41 further comprising cutting the stack to provide a compressed area between an insulating area and an outer edge of the stack.

44. The method of claim 39 wherein the compressing and securing steps are performed simultaneously.

45. The method of claim 41 wherein the steps of compressing and interengaging the layers are performed simultaneously.

46. The method of claim 42 wherein the cutting, compressing and securing steps are performed simultaneously.

47. The method of claim 43 wherein the cutting, compressing and interengaging the layers are performed simultaneously.

48. The method of claim 39 wherein said securing step comprises forming a plurality of openings extending in said vertical direction through said layers in said heat sink area by passing a punch through said layers, said punch including a plurality of spaced-apart projections, each of which forms a respective one of said openings and said compressing and securing steps being simultaneously performed with a composite tool comprising a compressible material which performs said compressing step and said punch which performs said securing step, the compressible material and the punch being mounted together in side-by-side relationship.

49. The method claim 39 further comprising a step of cutting said stack such that said heat sink are lies between said insulating area and an outer edge of sad stack, said cutting step being performed simultaneously with said compressing and securing steps.

50. The method claim 49 wherein said cutting, compressing and securing steps are simultaneously performed with a composite tool comprising a compressible material for comprising a compressible material for compressing said layers, a punch for securing said layers by forming at least one opening therein and a cutter for cutting said layers, said compressible material being mounted between said cutter and said punch, said compressible material contacting said stack before said cutter and said punch contact said stack during said simultaneous cutting, compressing and securing steps, said compressible material being compressed to a predetermined amount and compressing said stack in said heat sink area when said cutter cuts said stack and said punch punches said at least one opening.

51. A pad including thermal insulation and heat sink areas, comprising:

a plurality of layers (2) of metal foil forming a stack (3) wherein said layers (2) are arranged one above another in a vertical direction, said stack (3) including at least one heat sink area (4) and at least one thermal insulation area (5) adjacent to said heat sink area (4), at least one of said layers (2) being separated from an adjacent one of said layers (2) in said insulating area (5) so as to provide gaps therebetween wherein at least one of said layers (2) in said insulating area (5) is in point contact with another one of said layers and is not metallurgically bonded to another one of said layers in said insulating area (5); wherein said heat sink area (4) comprises a compressed portion of the stack whereby each layer (2) is in flat contact with an adjacent layer in the heat sink area (4) and the heat sink area (4) is located to dissipate heat from the pad.

52. The pad of claim 51 wherein a heat sink area is located at the outer periphery of the pad.

53. The pad of claim 51 wherein a heat sink area is located between the insulating area and the edge of the stack.

54. The pad of claim 51 wherein the pad is about 5 mm in thickness.

55. The pad of claim 51 wherein at least one of said layers (2) of metal foil is 0.05 mm or 0.02 mm in thickness.

56. The pad of claim 51 wherein said layers (2) in the heat sink area (4) being secured together by securing means (7).

57. The pad of claim 56, wherein said securing means (7) comprises stapling layers (2).

58. The pad of claim 56 wherein the securing means (7) comprises crimping the layers (2).

59. The pad of claim 56 wherein the securing means (7) comprises mechanical bonding of the layers (2).

60. The pad of claim 59 wherein the mechanical bonding of the layers (2) comprises interengaging the layers with each other.

61. The pad of claim 56 wherein the securing means (7) comprises metallurgical bonding of the layers (2).

62. The pad of claim 56 wherein the securing means (7) comprises an adhesive between the layers (2).

63. A pad of claims 51 comprising: means (100) for providing shapability to the pad.

64. The pad of claim 63, wherein said shapability means comprises at least one row of perforations (100) in said pad.

65. The pad of claim 64, wherein the perforations (100) extend completely through said pad.

66. The pad of claim 63 wherein said shapability means comprises a pattern of indentations in an outer one of said layers of said pad.

67. The pad of claims 51 wherein at least one of said layers (2) comprises a black surface on at least part of at least one side of said layer.

68. A method of making a heat insulating pad having insulating and heat sink areas, comprising:
- a step of assembling a plurality of layers (2) of metal foil in a stack wherein said layers are arranged one above another in a vertical direction, at least two of said layers being in point contact with each other and separated from each other by gaps between said layers (2) in the insulating area (5); and
- a step of compressing a portion of said stack such that heat sink (4) is formed adjacent to insulating areas (5) therein with said layers being in flat contact with each other in said heat sink area (4).

69. The method of claim 68 wherein the step of compressing is performed with a tool ($T_2$) comprising a compressible material (13).

70. The method of claim 68 further comprising the step of securing the layers (2) together in the heat sink area (4).

71. The method of claim 70 wherein the compressing and securing steps are performed simultaneously.

72. The method of claims 68 further comprising cutting the stack.

73. The method of claim 72 wherein the cutting, compressing and securing steps are performed simultaneously.

74. The method of claim 72 wherein the steps of compressing, securing and cutting are performed with a tool ($T_2$) comprising a cutter (14) mounted on a holder (15) in side-by-side relationship with compressible material (13) and comprising a punch (12) mounted in side-by-side relationship with said compressible material (13).

75. The method of claims 68 further comprising the step of applying a black coating to at least a portion of at least one side of at least one of said layers (2).

* * * * *